Patented June 9, 1936

2,043,670

UNITED STATES PATENT OFFICE 2,043,670

PRODUCTION OF MONOCHLORISOBUTYRIC ACID

Donald J. Loder, Wilmington, and Emil D. Ries, Gordon Heights, Del., assignors to E. I. du Pont de Nemours & Company, Wilmington, Del., a corporation of Delaware No Drawing. Application February 21, 1934, Serial No. 712,354

12 Claims. (Cl. 260—113)

This invention relates to the manufacture of chlorisobutyric acid and more particularly to a method for the production of monochlorisobutyric acid from isobutyric acid and chlorine.

An object of the present invention is to provide an improved process for making monochlorisobutyric acid in high yield and with a minimum amount of higher chlorinated bodies and other by-products.

It is a further object of the invention to provide methods of procedure and operating conditions whereby, as desired, preponderating proportions of alphamonochlorisobutyric acid or betamonochlorisobutyric acid may be obtained.

Other objects and advantages of the invention will be apparent as it is better understood from the following specification and examples setting forth its preferred embodiments.

According to the invention, monochlorisobutyric acid is obtained in good yield and with a minimum amount of higher chlorinated products and other by-products by conducting gaseous chlorine into a body of isobutyric acid containing specified amounts of dissolved chlorinating catalyst, which latter may be isobutyryl chloride or isobutyric anhydride or a substance capable of reacting, in the presence of chlorine and isobutyric acid, to form one or both of these. Substances capable of so reacting include generally inorganic or organic acid halides or anhydrides, such, for example, as sulphur chloride (or sulphur, which in the presence of chlorine forms sulphur chloride), thionyl chloride, phosphorus chloride, sulphur trioxide, phosphorus oxides, chlorides or anhydrides of acetic, propionic, butyric, and benzoic acids, etc. Substances of the classes named favor formation of isobutyryl chloride and/or anhydride in presence of chlorine and isobutyric acid, hence catalyze chlorisobutyric acid formation which apparently proceeds thus: isobutyryl chloride- isobutyric anhydride- chlorisobutyric acid.

Of the catalysts referred to, sulfur best combines efficacy and cheapness and accordingly the invention is hereinafter described particularly with reference to the use of a sulfur catalyst, although it is to be understood that the use of equivalent amounts of the other chlorinating catalysts is likewise within the scope of the invention.

In accordance with the invention, then, good yields of monochlorisobutyric acid are obtained, with minimum amounts of higher chlorinated and other undesirable substances, by effecting the chlorination in the presence of dissolved sulfur not exceeding 4% by weight or equivalent amount of other chlorinating catalyst as hereinbefore defined. While it has been found that a small amount, even a fraction of a per cent., will accelerate the desired chlorination and whereas, if desired, amounts up to and including 4% by weight may be employed, the amount of sulfur should not exceed that figure, for with a larger proportion we have found that undesirable quantities of polychlorisobutyric acid and products of side reactions are obtained. The chlorination, which is exothermic, may be initiated and carried on at ordinary temperatures, especially under the influence of light, as well as at various temperatures up to and including about 135° C. However, generally speaking, it has been found preferable to maintain the reaction mixture, by suitable cooling, at a temperature within the range of about 125° to 130° C.

It is to be understood that while, as hereinafter explained, the yield of monochlor acid may also be favorably influenced by the extent of chlorination, for any given amount of chlorination monochlor acid formation is favored by employing catalyst concentrations within the above stated limits.

We have found that, apart from the foregoing observation as to the importance of the concentration of catalyst the extent to which monochlorisobutyric acid is produced to the exclusion of other chlorinated bodies and by-products, is critically affected by the extent of the chlorination. Generally speaking, however, neither the rate at which chlorine is introduced, the elapsed time, nor the actual gain of weight is a reliable criterion of the degree of monochlorisobutyric acid production. On the other hand, our investigations have shown that the relative yield of monochlorisobutyric acid is directly connected with the concentration of unreacted isobutyric acid in the reaction mixture. More specifically we have found that the maximum production of monochlorisobutyric acid is obtained when the chlorination is carried to, and stopped at, substantially the point where isobutyric acid has completely disappeared from the reaction system.

In the practical application of this observation to the production of monochlorisobutyric acid, we have found that the specific gravity of the reaction mixture is the most reliable and practical guide to the extent to which the desired chlorination has proceeded. That is to say, the specific operating conditions and apparatus having been selected and established in any particular case, a trial chlorination run is made, in which, as the reaction proceeds, samples are withdrawn and examined for specific gravity and content of free isobutyric acid, the latter being determined, for example, by fractional distillation. Such tests having finally determined the specific gravity corresponding to the point at which the isobutyric acid has disappeared from the system, subsequent operation of the process is effected so that chlorination proceeds only up to the point at which this determined value of specific gravity is attained. While it is not necessary that this specific gravity be exactly duplicated in every case, we have found that the value cannot substantially be departed from without seriously affecting the yield of monochlorisobutyric acid. As a matter of fact, variations of more than ±0.01 from the specific gravity determined in the manner indicated, will, generally speaking, result in an undesirable decrease in the yield of monochlorisobutyric acid.

It will be noted that it is impossible to prescribe for all conditions of operation the optimum specific gravity to be attained. Thus variation in the nature and percentage of catalyst employed will necessarily alter the specific gravity of the reaction mixture. However, by way of illustration, in the chlorination of isobutyric acid containing 3% sulfur, maximum yield of monochlorisobutyric acid has been obtained by stopping the chlorination when the reaction mixture had attained a specific gravity of 1.185 to 1.190 at 30° C.

For many purposes there is a marked difference in the value of alpha- and betachlorisobutyric acids, respectively. Accordingly, another feature of the invention is the provision of operating conditions whereby the production of either alpha-monochlorisobutyric or beta-monochlorisobutyric acid may be favored.

We have found that the relative proportions of alpha and betamonochlorisobutyric acid obtained are directly connected with the concentration of catalyst and also with the chlorination temperature. Specifically, we have discovered that the chlorination may be made to proceed so as to yield alphamonochlorisobutyric acid, practically to the exclusion of the betachlor acid, by effecting the chlorination at a temperature above about 115° C. and employing between 2 and 4% by weight of sulfur (or equivalent amount of other chlorinating catalyst) in the acid to be chlorinated. The best results have been obtained at a temperature of about 125–130° C. Operating under these general conditions, for example, we have been able to obtain a yield of 80% or more alphamonochlorisobutyric acid based on the isobutyric acid initially introduced, with substantially no betamonochlorisobutyric acid.

On the other hand, when it is desired to obtain principally betamonochlorisobutyric acid, we have found it most advantageous to operate with a sulfur content of from 0.3 to 2% (or equivalent amount of other chlorinating catalyst) and at a temperature of from room temperature to about 115°, preferably at about 70° C. Operating under these conditions, we have been able to obtain a 60% yield of monochlorisobutyric acid, the ratio of beta- to alphachlor acid being as high as 4 to 1.

The following examples are given to illustrate in more detail the practical operation of the invention. It is to be understood, however, that the examples are illustrative only and that they may be varied widely, particularly as to specific proportions of materials, operating conditions, and manipulative details, without departing from the invention.

*Example 1.*—Alphachlorisobutyric acid is prepared in good yield as follows: A charge of 9 gallons of isobutyric acid is placed in a 50 liter Pyrex flask, surrounded by an oil bath heated with steam coils. A water-cooled glass condenser followed by an ice-cooled glass coil furnishes the desired reflux. Three per cent. by weight of sulfur is added to the charge. The temperature is raised to about 80° C. and a flow of sulfuric acid-washed chlorine is started. The temperature is then raised to and maintained at 125–130° C. Vigorous stirring is used. Chlorination to the desired end point of a specific gravity of 1.187–1.188 at 30° C. is completed after about six hours, 65 to 70 lbs. of chlorine having been run in. The product is practically entirely alphachlorisobutyric acid, with substantially no betachlor acid. On fractional distillation a yield of about 80% alphachlorisobutyric acid is obtained.

*Example 2.*—A mixture of alpha- and beta-chlorisobutyric acids, with the latter preponderating, is prepared as follows: Chlorine was bubbled through a charge of 15.9 mols of isobutyric acid containing 0.35% dissolved sulfur. The temperature was maintained at 70° C. and the chlorination interrupted when the specific gravity of the reaction mixture reached 1.208 (30° C.). On fractional distillation, a yield of 60.4% of monochlorisobutyric acid was obtained, the ratio of alpha to betachlor acid therein being 0.241.

*Example 3.*—Isobutyric acid (15.9 mols) was chlorinated in the presence of isobutyryl chloride (19%) as catalyst, the temperature being 130° and the chlorination being continued until the specific gravity of the material was 1.176 (30° C.). A yield of 79.2 monochlorisobutyric acid resulted, the ratio of alpha to betachlor acid being 6.6.

*Example 4.*—By chlorinating isobutyric acid (12.75 mols) containing isobutyryl chloride (16.4%) as catalyst at 130° C. to a specific gravity of 1.139 (30° C.), a yield of 84% monochlorisobutyric acid was obtained, with a ratio of alpha to betachlor acid of 4.4.

*Example 5.*—When chlorinating isobutyric acid (11.35 mols) containing thionyl chloride (20.9%) as catalyst at 130° C., chlorination was discontinued when the specific gravity reached 1.134 (30° C.). The yield of monochlorisobutyric acid recovered was 83.5%, with a ratio of alpha to betachlor acid of 5.7.

*Example 6.*—Using phosphorus trichloride (2%) as catalyst, isobutyric acid (15 gram mols) was chlorinated at 100–128° C. until the charge had gained 600 g. in weight. The yield of alpha monochlorisobutyric acid was 22%, of betamonochlorisobutyric acid 32%.

In the manufacture of monochlorisobutyric acid it is advisable to exclude iron from the reaction system since its presence accelerates formation of higher chlorinated bodies. Thus glass-lined or enamel-lined equipment is recommended, or vessels made of corrosion resistant alloys that will not yield dissolved iron in the reaction system in question.

Various changes may be made in the invention, including modification of manipulative details and selection of catalyst equivalent to those specifically mentioned, without departing from the invention or sacrificing the advantages thereof.

We claim:

1. Process for the manufacture of monochlorisobutyric acid which comprises chlorinating isobutyric acid containing added sulfur in amount not in excess of 4% by weight of the isobutyric acid.

2. Process for the manufacture of monochlorisobutyric acid which comprises chlorinating isobutyric acid containing added sulfur in amount not in excess of 4% by weight of the isobutyric acid at a temperature not in excess of 135° C.

3. Process for the production of alphachlorisobutyric acid which comprises chlorinating isobutyric acid in the presence of from 2 to 4% by weight of sulfur.

4. Process for the production of alphachlorisobutyric acid which comprises chlorinating isobutyric acid in the presence of from 2 to 4% by weight of sulfur at a temperature within the range of 115 to 130° C.

5. Process for the production of alphachlorisobutyric acid which comprises chlorinating isobutyric acid in the presence of from 2 to 4% by weight of sulfur at a temperature within the range of 125–130° C.

6. Process for the production of betamonochlorisobutyric acid which comprises chlorinating isobutyric acid in the presence of from 0.3 to 2% sulfur.

7. Process for the production of betamonochlorisobutyric acid which comprises chlorinating isobutyric acid in the presence of from 0.3 to 2% sulfur at a temperature not in excess of 115° C.

8. Process for the production of betamonochlorisobutyric acid which comprises chlorinating isobutyric acid in the presence of from 0.3 to 2% sulfur at a temperature of about 70° C.

9. In a process for the manufacture of monochlorisobutyric acid in which isobutyric acid is chlorinated in the presence of sulfur in an amount not in excess of 4% by weight of the isobutyric acid, the step which comprises chlorinating the isobutyric acid only until there is substantially no unchlorinated isobutyric acid present.

10. In a process for the manufacture of monochlorisobutyric acid in which isobutyric acid is chlorinated in the presence of sulfur in an amount not in excess of 4% by weight of the isobutyric acid, the step which comprises chlorinating the isobutyric acid only until the specific gravity of the reaction mixture differs by not more than 0.01 from that just corresponding to complete disappearance of isobutyric acid.

11. Process for the manufacture of monochlorisobutyric acid which comprises chlorinating isobutyric acid only until there is substantially no unchlorinated isobutyric acid present, the chlorination being effected in the presence of from 2 to 4% by weight of sulphur.

12. Process for the manufacture of monochlorisobutyric acid which comprises chlorinating isobutyric acid only until the specific gravity of the reaction mixture differs by not more than 0.01 from that just corresponding to complete disappearance of the isobutyric acid, the chlorination being effected in the presence of from 2 to 4% by weight of sulphur at a temperature ranging between 125 and 130° C.

DONALD J. LODER.
EMIL D. RIES.